Sept. 5, 1967  J. H. COWLES  3,339,687
RETAINER FOR OVERRUNNING CLUTCH ROLLERS
Filed Oct. 24, 1965  2 Sheets-Sheet 1
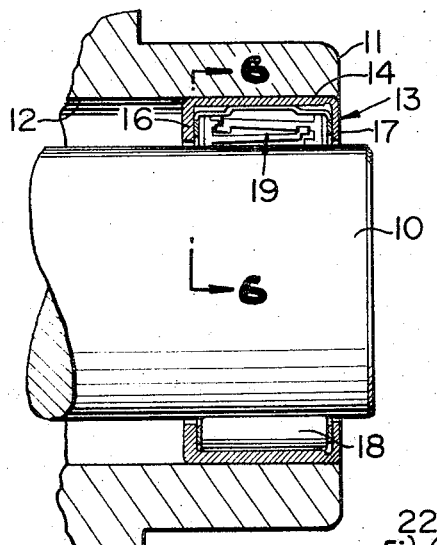
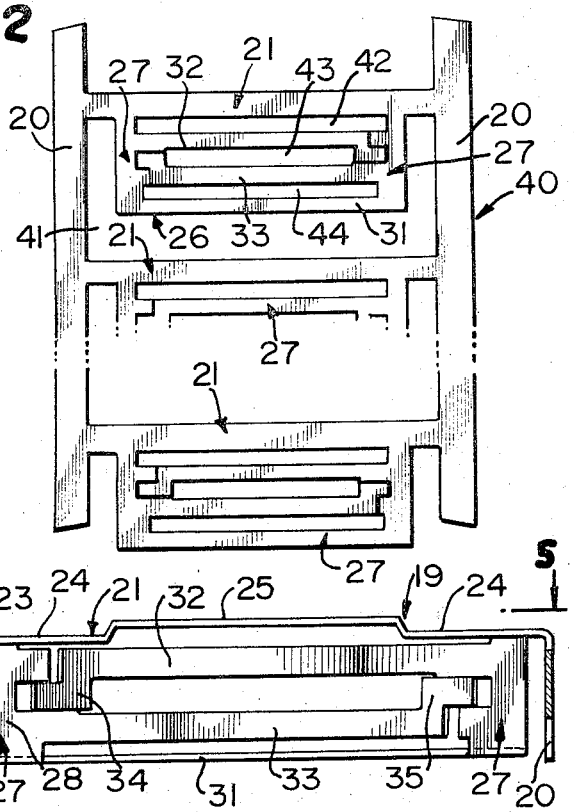
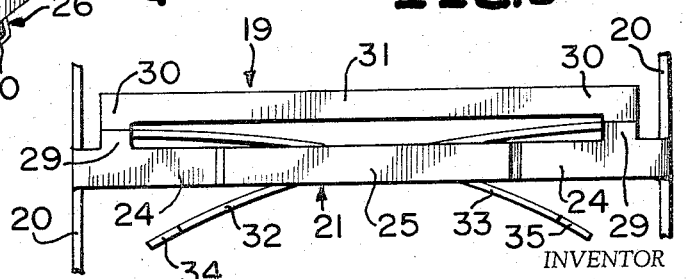
INVENTOR
JOHN H. COWLES
BY Mason, Porter, Diller & Brown
ATTORNEYS Sept. 5, 1967  J. H. COWLES  3,339,687
RETAINER FOR OVERRUNNING CLUTCH ROLLERS
Filed Oct. 24, 1965  2 Sheets-Sheet 2
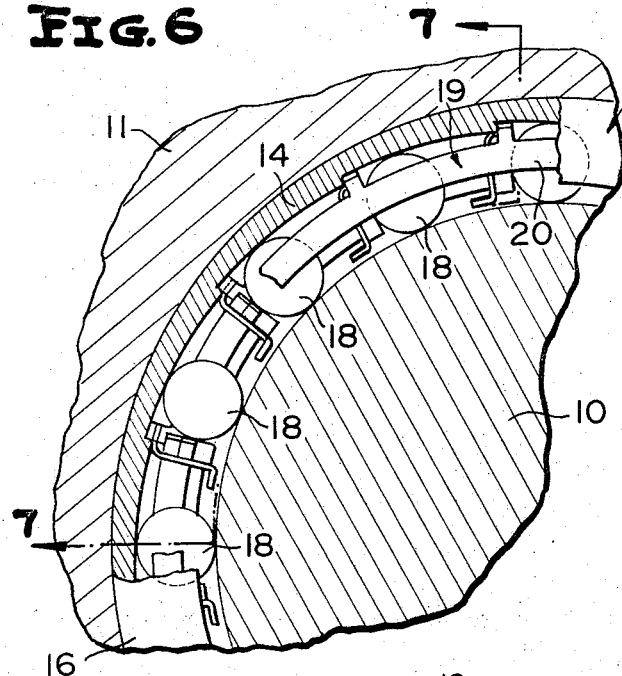
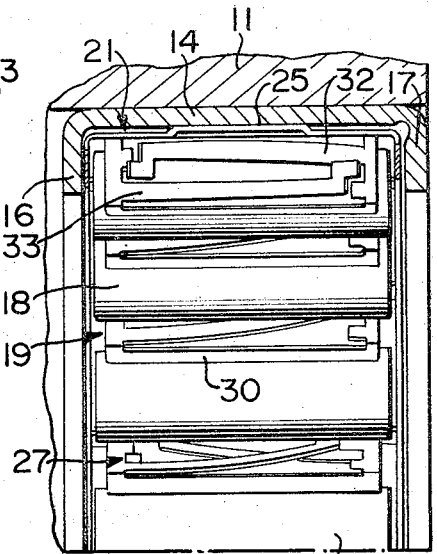
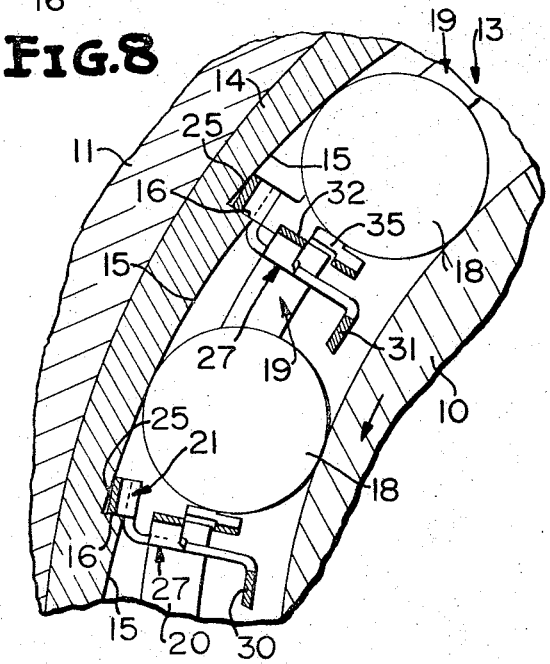
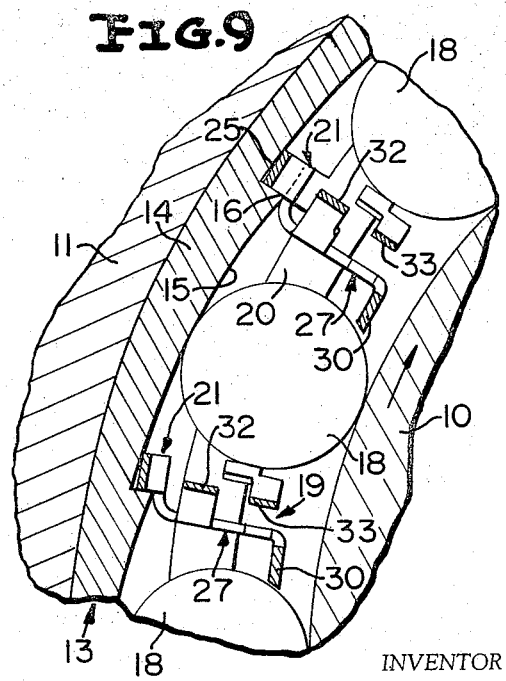
INVENTOR
JOHN H. COWLES
BY Mason, Porter, Diller & Brown
ATTORNEYS

United States Patent Office 3,339,687
Patented Sept. 5, 1967

3,339,687
RETAINER FOR OVERRUNNING CLUTCH ROLLERS
John H. Cowles, Forestville, Conn., assignor to The Torrington Company, Torrington, Conn., a corporation of Maine
Filed Oct. 24, 1965, Ser. No. 504,784
10 Claims. (Cl. 192—45)

This invention relates in general to new and useful improvements in overrunning roller clutches, and more particularly to a novel retainer therefor.

A primary object of this invention is to provide a novel retainer for overrunning roller clutches which is readily formable by a stamping operation from a continuous strip of metal and wherein when the metal strip is bent to final form, the retainer will have the necessary surfaces for interlocking with an outer clutch member, supporting rollers within the outer clutch member when the clutch is not assembled with a shaft, and resiliently urging the rollers towards a coupling position.

Another object of this invention is to provide a novel retainer for overrunning roller clutches wherein the retainer is formed of sheet metal and includes a pair of annular rims connected together by cross bars, which cross bars have upwardly projecting portions engageable with abutment surfaces on a clutch member so as to position the retainer relative to a clutch member.

Another object of this invention is to provide a novel retainer of the type utilized in overrunning roller clutches wherein the retainer includes a plurality of cross bars having depending therefrom panel like members which have portions thereof removed and other portions deformed so as to form a pair of springs disposed in opposed crossed relation and a roller supporting bar.

A further object of this invention is to provide a novel retainer particularly adapted for use in overrunning roller clutches wherein the retainer is formed of a single piece of sheet metal which has been cut and shaped so as to perform the required functions of the retainer and at the same time the retainer is of an extremely simply construction which may economically manufactured and which retainer has a long life.

With the above and other object in view that will hereinafter appear, the nature of the invention will be more clearly understood by reference to the following detailed description, the appended claims and the several views illustrated in the accompanying drawings.

In the drawings:

FIGURE 1 is a fragmentary sectional view showing a typical installation of an overrunning roller clutch between a machine element and a shaft, the clutch utilizing the retainer of this invention.

FIGURE 2 is a plan view of a blank from which the retainer is formed, an intermediate portion of the blank being omitted.

FIGURE 3 is a fragmentary perspective view of the retainer.

FIGURE 4 is a transverse sectional view taken along the line 4—4 of FIGURE 3.

FIGURE 5 is a fragmentary plane view of the retainer along the line 5—5 of FIGURE 4.

FIGURE 6 is an enlarged fragmentary sectional view taken along the line 6—6 of FIGURE 1.

FIGURE 7 is a fragmentary sectional view taken along the line 7—7 of FIGURE 6 with the shaft omitted.

FIGURE 8 is an enlargement of the section through the assembly of FIGURE 6 and shows more specifically the details of the overrunning clutch, the clutch being in its inoperative position.

FIGURE 9 is a sectional view similar to FIGURE 8 and shows the clutch in its operative position.

Referring to the drawing in detail, it will be seen that there is illustrated in FIGURE 1 a clutch coupled machine assembly which includes a shaft 10 and a machine element 11. The machine element 11 is journalled relative to the shaft 10 for relative rotation and has an internal bore 12 through which the shaft 10 passes. An overrunning clutch, which is generally referred to by the numeral 13, is pressed into the bore 12 and the shaft 10 passes through the clutch 13.

The clutch 13, with the exception of the specific retainer thereof is of a conventional construction, and includes an outer clutch member 14, which, as is best shown in FIGURE 8, has an interior surface in the form of a plurality of axially extending, circumferentially spaced cam surfaces 15. The cam surfaces 15 are so related wherein a stop shouldere 16 is formed between each pair of adjacent cam surfaces 15. The outer clutch member 14 is preferably formed of sheet metal for purposes of economy of manufacture and the cam surfaces 15 will be embossed therein. The outer clutch member 14 also includes a pair of radially extending lips 16 and 17.

The clutch 13 includes a plurality of rollers 18, there being one roller 18 for each of the cam surfaces 15. The rollers 18 are maintained in circumferentially spaced relation, as well as axially aligned relation by means of a retainer which is the subject of this invention and which is generally referred to by the numeral 19.

Referring now to FIGURE 3 in particular, it will be seen that the retainer 19 is formed of a pair of annular rims 20 which lie in radial planes. The rims 20 are connected together at regular intervals by circumferentially spaced cross bars 21. Each cross bar 21 has at the ends thereof radially extending terminal portions 22 which lie in the same radial planes as the rims 20 and project radially therefrom. The terminal portions 22 of each cross bar 21 are connected to the remainder of the cross bar 21 by relatively sharp radii 23.

The central part of each cross bar 21 is radially outwardly offset to define a pair of end portions 24 and a central portion 25. It is to be noted that the central portion 25 projects a material distance radially outwardly of the remainder of the cross bar 21.

To each cross bar 21 there is connected a generally rectangular panel 26 which has been cut and bent to define a pair of Z-shaped arms 27 which depend radially inwardly from the cross bar 21. Each arm 27 includes a radially extending central part 28 which is provided at its outer end with a circumferentially extending connecting part 29 that is integrally connected to an adjacent edge of the cross bar 21 along the outer portion 24 thereof. The radially inner end of the radially extending part 28 terminates in a second circumferentially extending part 30 which projects in an opposite direction from the part 29. The parts 30 of two adjacent arms 27 are connected together by a roller support bar 31, the roller support bar 31 being generally parallel to the associated cross bar 21.

Each panel 26 has struck therefrom a pair of springs 32 and 33. The springs 32 and 33 extend in opposite directions from the arms 27 and are arcuate in plan. It is to be noted that the springs of each pair are disposed in crossing relation as is best shown in FIGURE 5. The springs 32 and 33 of each pair are radially offset with respect to one another with the spring 32 being disposed outermost.

It is to be noted that each spring 32 has a free end portion 34 which is radially inwardly offset from the remainder thereof. At the same time, each spring 33 has a free end portion 35 which is radially outwardly offset. The relative offsetting of the springs 32 and 33 and their free end portions 34 and 35 is such that the end portions 34 and 35 lie in a common cylindrical path as is best shown in FIGURE 4.

Referring now to FIGURE 2 in particular, it will be seen that the retainer 19 is formed from a strip type blank which is generally referred to by the numeral 40. The blank 40 starts as a strip of metal of predetermined width. By punching a generally C-shaped opening 41 in the strip of metal, the rims 20, the cross bars 21 and the panel 26 are defined. The panel 26 is provided with cut outs 42, 43 and 44 to define the springs 32 and 33, the arms 27 and the roller support bar 31. The blank 40 is now complete, and is subsequently bent into the configuration shown in FIGURE 3. It is to be understood that the ends of the rim 20 are suitably welded together so as to be continuous. The retainer is then suitably hardened as by heat treatment.

In the formation of the clutch 13, normally the outer clutch member 14 is formed with the lip or flange 17 thereof coextensive with the body portion. The retainer 19 if positioned within the clutch member 14 and thereafter the lip or flange 17 is bent to its radial position. The rollers 18 are then snapped into place between the adjacent panels 26 and each pair of springs 32, 33 serves to hold a roller against the respective cam surface 15 and the roller support bar 31.

Referring now to FIGURE 8 in particular, it will be seen that in the free wheeling or inoperative position of the clutch 13, the shaft 10 is turning in a counterclockwise direction with respect to the clutch member 14, assuming the clutch member 14 to be fixed. This relative rotation of the shaft 10 causes the movement of the rollers 15 towards the shoulder 16 of the outer clutch member 14 and against the springs 32, 33, compressing these springs. The rotation of the retainer 19 in a counterclockwise direction with the shaft is prevented by engagement of the offset central portions 25 of the cross bars 21 with the stop shoulders 16. Under these conditions, the rollers 18 freely rotate between the shaft 10 and the outer clutch member 14 and the clutch 13 is in its free wheeling or inoperative position.

Referring now to FIGURE 9 in particular, the shaft 10 is illustrated as rotating in a clockwise direction. In this condition of operation the clutch 13, the rollers 18 are being urged in a clockwise direction both by the springs 32, 33 and by the rolling effect of the rollers 18 due to being driven by the shaft 10. The rollers 18 have now moved into wedged relation between the shaft 10 and the cam surfaces 15 of the outer clutch member 14 and serve to interlock the outer clutch member 14 with the shaft 10. This is the operative position of the clutch 13. It is to be noted that the rollers 18 are always urged towards this operative position by the springs 32, 33 and the reaction of the retainer 19 against the stop shoulders 16 of the outer clutch member 14.

It is to be noted that by providing the abutment surfaces of the retainer 19, the offset central portion 25 of the cross bars 21, on that portion of the retainer closest to the springs 32, 33, the construction of the retainer is not only simplified, but also made stronger. In a retainer 19, the rims 20 primarily serve to space the cross bars 21 and the panels 26 carried thereby.

Although only a preferred embodiment of the invention has been specifically illustrated and described herein, it is to be understood that minor variations may be made in the disclosed retainer without departing from the spirit and scope of the invention, as defined by the appended claims.

I claim:

1. A retainer for an overrunning roller clutch comprising a pair of side rims, cross bars extending between said rims at the outer edges thereof, an arm depending from each cross bar adjacent each rim, a roller support bar connecting together inner ends of axially adjacent arms, and a spring extending from each arm, said springs of axially adjacent arms extending in opposed relation and being radially offset.

2. The retainer of claim 1 wherein said cross bars have radially extending end portions spacing said cross bars radially outwardly of said rims.

3. The retainer of claim 1 wherein each cross bar has a central portion radially outwardly offset forming a shoulder for engagement with an outer clutch member shoulder to limit the rotation movement of said retainer relative to an outer clutch member.

4. The retainer of claim 1 wherein free ends of said springs are radially offset and lie in a common cylindrical path.

5. The retainer of claim 1 wherein said arms are Z-shaped in elevation and said springs and said roller support bars are disposed in opposed relation.

6. The retainer of claim 1 wherein said arms, said springs and said roller support bar carried by each cross bar are all formed from a single rectangular panel.

7. The retainer of claim 1 wherein each pair of springs include one spring disposed radially outwardly of the pitch circle of the intended position of rollers and one spring disposed radially inwardly of the pitch circle, and end portions of said springs are radially offset and are generally centered on said pitch circle.

8. The retainer of claim 1 wherein said cross bars have radially extending end portions spacing said cross bars radially outwardly of said rims, each cross bar has a central portion radially outwardly offset forming a shoulder for engagement with an outer clutch member shoulder to limit the rotation movement of said retainer relative to an outer clutch member.

9. The retainer of claim 1 wherein each cross bar has a central portion radially outwardly offset forming a shoulder for engagement with an outer clutch member shoulder to limit the rotation movement of said retainer relative to an outer clutch member, and said arms are connected to said cross bars on opposite sides of said radially outwardly offset cross bar central portions.

10. The retainer of claim 1 wherein said springs are arcuate in plan and are disposed in crossing relation.

References Cited

UNITED STATES PATENTS 3,055,472  9/1962  Sauzedde _____ 192—45
3,241,641  3/1966  Cowles _____ 192—45

BENJAMIN W. WYCHE III, *Primary Examiner.*